United States Patent [19]

Ezzell et al.

[11] Patent Number: 4,478,695
[45] Date of Patent: Oct. 23, 1984

[54] SULFONIC ACID ELECTROLYTIC CELL MEMBRANES AND USE THEREOF IN THE ELECTROLYSIS OF SODIUM CHLORIDE

[75] Inventors: Bobby R. Ezzell, Lake Jackson; William P. Carl, Angleton; William A. Mod, Lake Jackson, all of Tex.

[73] Assignee: The Dow Chemical Company, Midland, Mich.

[21] Appl. No.: 529,177

[22] Filed: Sep. 2, 1983

Related U.S. Application Data

[62] Division of Ser. No. 341,431, Jan. 21, 1982, Pat. No. 4,417,969, which is a division of Ser. No. 158,424, Jun. 11, 1980, Pat. No. 4,358,545.

[51] Int. Cl.$^3$ .......................... C25B 1/34; C25B 9/00; C25B 134/02; C25B 13/08
[52] U.S. Cl. ...................................... 204/98; 204/128; 204/252; 204/296
[58] Field of Search .................. 204/98, 128, 252, 296

[56] References Cited

U.S. PATENT DOCUMENTS

| | | | |
|---|---|---|---|
| 4,178,218 | 12/1979 | Seko | 204/98 |
| 4,209,367 | 6/1980 | Seko et al. | 204/98 |
| 4,255,240 | 3/1981 | Molnu et al. | 204/98 |
| 4,329,435 | 5/1982 | Kimoto et al. | |

FOREIGN PATENT DOCUMENTS

2244154  3/1973  Fed. Rep. of Germany ........ 204/98

Primary Examiner—Howard S. Williams
Assistant Examiner—Terryence Chapman

[57] ABSTRACT

An improved polymer for use as an ion exchange membrane in an electrolytic cell wherein the polymer has pendant chains containing sulfonic acid ion exchange groups and has an equivalent weight of between about 800 and about 1500. The polymers have a hydration product of less than about 22,000.

The electrolytic cell and its method of operation are described when these polymers are used as ion exchange membranes.

7 Claims, 1 Drawing Figure

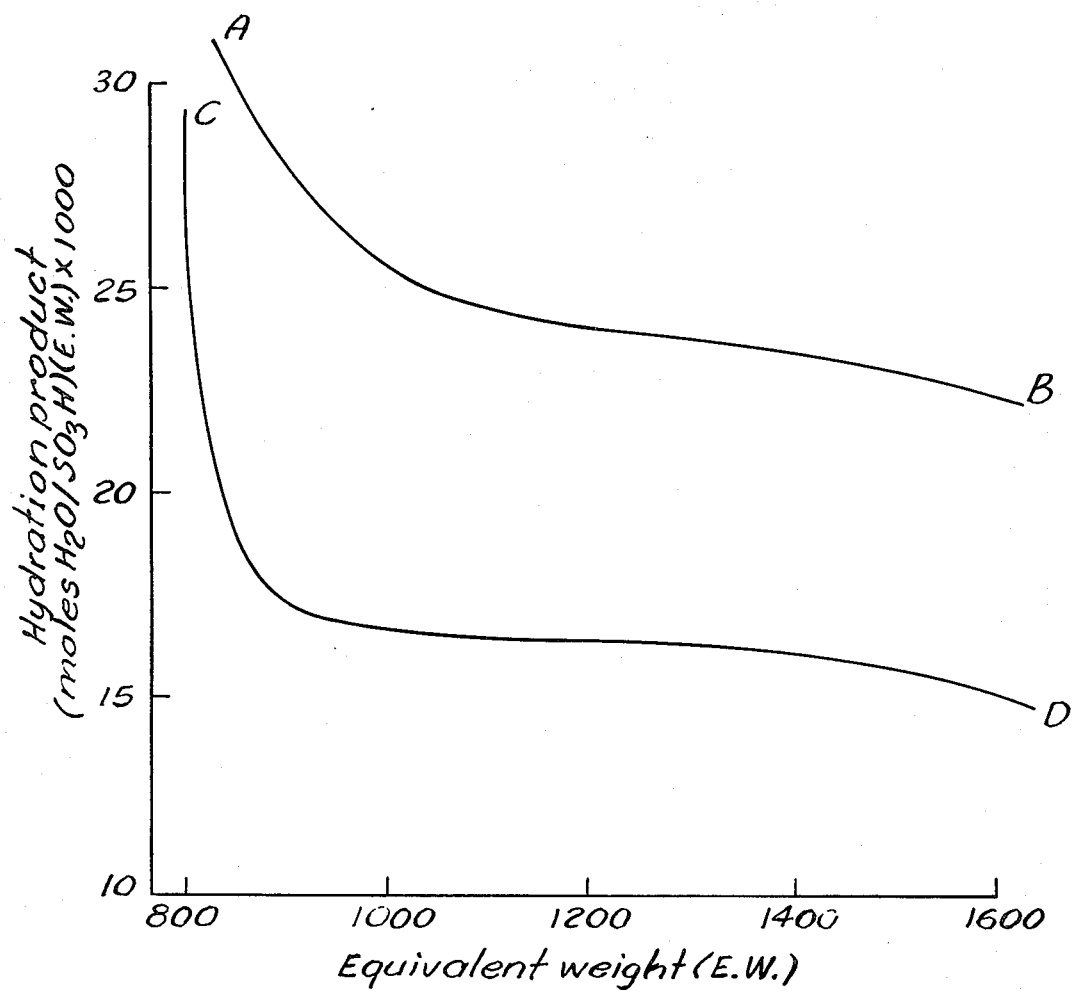

SULFONIC ACID ELECTROLYTIC CELL MEMBRANES AND USE THEREOF IN THE ELECTROLYSIS OF SODIUM CHLORIDE

This is a divisional of application Ser. No. 341,431, filed Jan. 21, 1982 now U.S. Pat. No. 4,417,969, which is a divisional of Ser. No. 158,424, filed June 11, 1980, now U.S. Pat. No. 4,358,545.

BACKGROUND OF THE INVENTION

The electrolytic production of chlorine and caustic by the electrolysis of brine has been well known for many years. Historically, diaphragm cells using a hydraulically-permeable asbestos diaphragm, vacuum-deposited onto foraminous steel cathodes, have been widely commercialized. Such diaphragm cells, employing permeable diaphragms, produce NaCl-containing NaOH catholytes because NaCl passes through the diaphragm from the anolyte to the catholyte. Such NaCl-containing caustic generally requires a de-salting process to obtain a low-salt caustic for industrial purposes.

In recent years, the chlor-alkali industry has focused much of its attention on developing membrane cells to produce low-salt or salt-free caustic in order to improve quality and avoid the costly desalting processes. Membranes have been developed for that purpose which are substantially hydraulically-impermeable, but which will permit hydrated Na+ ions to be transported from the anolyte portions, while substantially preventing transport of Cl ions. Such cells are operated by flowing a brine solution into the anolyte portion and by providing salt-free water to the catholyte portion to serve as the caustic medium. The anodic reactions and cathodic reactions are the same regardless of whether a membrane cell or a diaphragm cell is employed.

Since the disclosure of fluorocarbon polymers containing sulfonic acid functional groups (U.S. Pat. No. 3,282,875), a great deal of progress has been made in adapting the polymers for use as membrane materials in electrochemical cells. The bulk of this work has dealt with the production of chlorine and caustic soda. The membrane materials are also applicable to caustic potash and as separators for a variety of other membrane separator applications. In chlor-alkali applications, the membrane materials can be used in cells which produce hydrogen as a co-product of the cathodic reaction producing caustic soda or they may be used in chlor-alkali cells which contain depolarized cathodes (U.S. Pat. No. 4,035,254 and U.S. Pat. No. 4,035,255); cells where caustic soda is produced without the attendent production of hydrogen.

In general, the polymers have found most widespread use in the above applications when the functional group is on a fluorocarbon chain which is pendant to the main polymer backbone. Fluorocarbon sulfonic acid polymers and carboxylic acid polymers have been disclosed which have the functional group attached directly to the backbone, but these polymers have found scant utility (U.S. Pat. No. 3,041,317 and Brit. Pat. No. 1,497,748). The polymer materials, whether fluorocarbon sulfonic acids or carboxylic acids, have in general been made by copolymerizing monomers such as tetrafluoroethylene or chlorotrifluoroethylene with fluorocarbon vinyl ethers which contain an acid or an acid precursor functional group (U.S. Pat. No. 3,282,875 and Brit. Pat. No. 1,518,387).

The function of a membrane in a chlor-alkali cell is to separate the product(s) produced at the cathode, from the products and salt in the anolyte compartment. The membrane must effect this separation at low electrical resistance to be economical. Three factors prevail in measuring the efficiency at which a given membrane performs: (1) current efficiency is a measure of how well the membrane prevents hydroxide ion formed in the catholyte chamber from migrating to the anolyte chamber; (2) caustic concentration in the catholyte chamber is important because water is evaporated from the cell product; and (3) cell voltage, which reflects the electrical resistance of the membrane among other things, determines the power requirements of operating the cell.

A relationship between water absorption of the polymer and usefulness of the polymer as a membrane has long been recognized (W. G. F. Grot, et al., Perfluorinated Ion Exchange Membranes, 141st National Meeting The Electrochemical Society, Houston, Tex., May, 1972). Grot disclosed that the capacity of the polymer to absorb water is a function of the equivalent weight, the history of pretreatment of the polymer and the electrolytic environment of the polymer. The equivalent weight is the weight of polymer which will neutralize one equivalent of base. A standard method of measuring water absorption for meaningful comparisons is given in Grot's paper (above). The method consists of boiling the polymer for 30 minutes in water with the polymer being in the sulfonic acid form. The water absorbed by the polymer under these conditions is called the "Standard Water Absorption". The sulfonic acid membranes reported on in Grot's paper are polymers disclosed in U.S. Pat. No. 3,282,875.

Since the original disclosure of the sulfonic acid fluoropolymers, and particularly in recent years, functional groups other than sulfonic acid have received considerable attention. In fact, it has been stated that, because of excessive hydration, sulfonic acid groups cannot be used for making caustic above about 18% directly in the cell (M. Seko, "Commercial Operation of the Ion Exchange Membrane Chlor-Alkali Process", The American Chemical Society Meeting, April, 1976, New York, N.Y.). While high caustic strength is desirable, as a general rule, membranes capable of high current efficiency at high caustic concentration have higher electrical resistance. Thus, even though one carboxylic acid membrane is capable of producing in excess of 30% caustic at greater than 90% current efficiency, actual operation at 21.6% caustic was found to be more economical because of excessive electrical resistance at the higher caustic strengths. (M. Seko, "The Asahi Chemical Membrane Chlor-Alkali Process", The Chlorine Institute, Inc., 20th Chlorine Plant Managers Seminar, New Orleans, February, 1977). In addition to the many efforts to achieve higher caustic strength using carboxylic acid membranes, there has been a great deal of effort to achieve the same results with sulfonamides (U.S. Pat. No. 3,784,399). Again, higher caustic strength is achieved only at the expense of greater power consumption which is caused by higher electrical resistance of the membrane. In addition, membranes capable of higher caustic strengths are more adversely effected by impurities which enter the cell with the incoming salt feed. Thus, useful operating life of these membranes is generally less than sulfonic acid membranes.

One way of correlating functional groups to performance is to measure water of hydration per functional group in the polymer. Carboxylic acid polymers (U.S. Pat. No. 4,065,366) and sulfonamide polymers hydrate less than sulfonic acid polymers, (C. J. Hora, et al., Nafion ® Membranes Structured for High Efficiency Chlor-Alkali Cells, 152nd National Meeting The Electrochemical Society, Atlanta, GA., October, 1977) where the polymer structures are comparable. Changes in functional group concentration in a given polymer structure results in changes in the hydration water per functional group. Thus Hora disclosed that a 1500 eq. wt. sulfonic acid polymer of given structure has less water of hydration per functional group and operates at higher current efficiency than an 1100 eq. wt. polymer of the same general structure. In turn, the electrical resistance of the 1500 eq. wt. material is higher than the 1100 eq. wt. material because of fewer sites to transport ions and thus to conduct current. Sulfonic acids membranes which are useful in chlor-alkali cells are taught to have eq. wts. in the range of 1100 to 1500. In practice, eq. wts. of 1500 and 1600 are considered best for preventing migration of hydroxide ions from the catholyte to the anolyte without unreasonable cell voltage penalties (C. J. Hora, et al., Nafion ® Membranes Structured for High Efficiency Chlor-Alkali Cells, 152nd National Meeting The Electrochemical Society, Atlanta, GA., October, 1977). Extremely thin films of these materials are required to meet the voltage requirements.

Data for water absorption of sulfonic acid polymers and sulfonamide polymers has been published by Hora and Maloney in the above publication. In this paper, the polymer structures are the same except for the substitution of sulfonamide groups for sulfonic acid groups. The data shows that, for given eq. wts., the sulfonamides absorb only 35–60% as much water as do sulfonic acids. A particular case shown is a comparison of 1200 eq. wt. membranes. There, the sulfonic acid membrane absorbs about 20 moles of water per equivalent of sulfonic acid, while the sulfonamide, from methylamine, absorbs 12.3 moles of water per equivalent of sulfonamide and the sulfonamide, from ethylenediamine, absorbs only 8.1 moles of water per equivalent of sulfonamide. From another paper (H. Ukihashi, Ion Exchange Membrane For Chlor-Alkali Process, Abstract No. 247, American Chemical Society Meeting, Philadelphia, April, 1977) it can be calculated that a carboxylic acid membrane having an eq. wt. of 833 absorbs 8.3 moles of water per equivalent of carboxylic acid and that another having an equivalent weight of 667 absorbs 9.2 moles of water per equivalent of carboxylic acid.

In addition to the work described above where means for increasing caustic concentration in operating cells by using membranes having functional groups that hydrate less than sulfonic acids are used, methods for operating the cells, themselves, that lead to increased caustic concentration have been reported. Thus, series catholyte flow (U.S. Pat. No. 1,284,618) and series catholyte and anolyte flow (U.S. Pat. No. 4,197,179) can lead to increased caustic strength without sacrificing either current efficiency, cell voltage or membrane life. In addition, there are numerous applications where high strength caustic is not needed. In the case of caustic produced by diaphragm cells, evaporation is necessary to remove the salt in the caustic. This is not necessary with caustic produced in membrane cells. The only need for evaporation then becomes a matter of the few applications requiring high strength product and cases where the product is to be shipped long distances. Evaporation to high strength, such as 50%, reduces the volume to be shipped and, depending on the distance of shipment, can be more economical. Thus, it can be seen that in many applications and when series flow methods of cell operation are used, sulfonic acid membranes of the prior art and certainly improved sulfonic acid membranes are of great value.

U.S. Pat. No. 4,025,405 show electrolytic cells having a stable, hydrated, selectively permeable, electrically conductive membrane. The membrane is a film of fluorinated copolymer having pendant sulfonic acid groups containing recurring structural units of the formula:

and

where

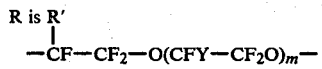

in which R' is F or perfluoroalkyl of 1 to 10 carbon atoms; Y is F or $CF_3$; m is 1, 2, or 3; n is 0 or 1; X is F, Cl, H, $CF_3$; X' and X are $CF_3$—$(CF_2)_z$ wherein Z is 0–5; the units of formula (1) being present in an amount of from 3–20 mole percent.

In addition to development of sulfonic acid fluoropolymers for use as membranes in electrolytic cells, the acid form of the polymers have received extensive interest as solid superacids. In general these materials have been used as strong acid catalyst for organic reactions. It has been reported that the polymers of the prior art are useful for alkylation of aromatics with olefins, alkyl halides, alcohols, esters, and the like as well as esterification, ketal (acetal) formation, Diels-alder reactions, pinacolpinacolone rearrangement and hydration of alkyner (G. A. Olah, New Synthetic Reagents and Reactions, Aldrichimica Acta, Vol. 12, No. 3, 1979).

BRIEF DESCRIPTION OF THE DRAWING

The FIGURE shows the hydration product, expressed as moles of water absorbed by a membrane per equivalent of $SO_3H$ present in the membrane, multiplied by the equivalent weight of the membrane vs. the equivalent weight of the membrane. Curve AB shows sulfonic acid membranes of the prior art and curve CD shows membranes of the present invention.

An improved polymer for use as an ion exchange membrane in an electrolytic cell wherein the polymer has pendant chains containing sulfonic acid ion exchange groups and has an equivalent weight of between about 800 and about 1500. The polymers have a hydration product of less than about 22,000.

The electrolytic cell and its method of operation are described when these polymers are used as ion exchange membranes.

DETAILED DESCRIPTION OF THE INVENTION

Ion exchange membranes having sulfonic acid groups and useful in chlor-alkali cells have been developed.

These materials hydrate when immersed in water or electrolytes less than sulfonic acid membranes reported in the prior art. The general structure of the sulfonic acid membranes that have received extensive attention for use in chlor-alkali cells and are sold under the trade name Nafion ® by E. I. duPont Company is as follows:

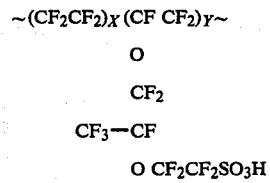

It has been discovered that polymers having a shorter chain between the functional group and the main polymer backbone absorb less water at a given concentration of functional group in the polymer than do polymers having the general structure of the prior art as shown above. Concentration of functional group in the dry polymer is measured herein, and in most of the prior art, and expressed as equivalent weight. Equivalent weight is defined, and conveniently determined, by standard acid-base titration, as the formula weight of the polymer having the functional group in the acid form required to neutralize one equivalent of base. Polymer structures representative of the present invention have substantially fluorinated backbones which have recurring pendant groups attached thereto and represented by the general formula

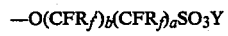

where
a=0-3
b=0-3
a+b=at least 1
$R_f$ and $R_f'$ are independently selected from the group consisting of a halogen and a substantially fluorinated alkyl group having one or more carbon atoms
Y is hydrogen or an alkali metal.

Optionally, the polymers of the present invention may also have recurring pendant groups attached thereto represented by the general formula

—OR where R is a straight or a branched substantially fluorinated alkyl chain which may be interrupted by oxygen atoms.

While the general structures shown above are representative of a group of polymers of the present invention, they are not intended to limit the scope of the present invention. It would become obvious to those skilled in the art, from the relationships presented herein that other sulfonic acid functional polymers having short pendant chains, sterically hindered sulfonate groups or the like would absorb less water per functional group and therefore, particularly at lower equivalent weights (<1500) perform in chlor-alkali cells superior to the polymers of the prior art.

One polymer represented by the general structures shown above

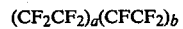

O
|
CF₂
|
CF₂
|
SO₃H when made into a film and the functional groups on one side, the cathode side in the cell, converted to sulfonamide (U.S. Pat. No. 3,784,399) has been taught as useful in chlor-alkali cells. The prior art does not teach the use of the sulfonic acid form of this particular polymer nor show any information that indicates benefit of having the short pendant group. In fact, this polymer has received scant attention presumably because of the difficulty in preparing the monomer, $FSO_2CF_2CF_2OCF=CF_2$, necessary in making the polymer (U.S. Pat. No. 3,560,568).

The use of polymers of lower eq. wt. (<1500) as membranes in chlor-alkali cells is particularly beneficial. Low eq. wts. are useable only when the water of hydration per functional group is low. The performance of a chlor-alkali cell is measured by two criteria; the current efficiency (the ability to prevent migration of hydroxide ion from catholyte to anolyte) and the voltage at which the cell operates. One method of expressing this as a single term is to determine the power efficiency, which is the product of the theoretical voltage divided by the actual voltage multiplied by the current efficiency. The most common method of comparing cells is to express the operation as kilowatt hours of power consumed per metric ton of product produced. This expression considers both voltage, higher voltage increasing the quantity KWH and current efficiency, lower efficiency decreasing the quantity of product produced. Thus, the lower the value KWH/mT, the better the performance of the cell.

The eq. wt. and the hydration per functional group of a polymer used as a membrane in a chlor-alkali cell have a direct influence on both of the quantities, voltage and current efficiency, that determine the overall efficiency at which a cell operates. The water of hydration per functional group, in effect, determines the size of the channels through which ions must travel to pass through the membrane. Larger channels allow more ions to penetrate into the membrane. Successful operation of the cell only requires that sodium ions be transported from the anolyte to the catholyte. Penetration of the membrane by hydroxide ion, along with the sodium counterion, leads to loss in current efficiency. Larger channels caused by excessive hydration lead to transport of hydroxide from catholyte to anolyte and thus a loss in current efficiency. Equivalent weight determines the number of sites available to transport the sodium ions from the anolyte to the catholyte. At a given applied current to the cell, a specific number of cations must be transported for cell operation. Thus, the larger the number of sites for transport, the lower electrical potential required to drive the ions.

Sulfonic acid membranes of the prior art which have long pendant chains separating the polymer backbone from the functional group, hydrate to such a large degree that equivalent weights of as low as 1100 to 1200 are not practically useable in chlor-alkali cells. While the voltage required when using these membranes is relatively good, the current efficiency is so low that the power consumed per metric ton produced is uneconomically high. Equivalent weights of 1500 or higher are required, as demonstrated by the prior art, to arrive at a point where hydration is low enough to achieve acceptable current efficiency, but where voltage is not yet high enough to render them impractical. The present invention demonstrates that, although the above materials at higher equivalent weights are useable when compared to other methods for producing chlorine and caustic, sulfonic acid membranes that hydrate less are superior in cell performance. The main defining feature of the new materials are that at a given eq. wt. hydration per functional group is lower.

Particularly preferred membranes of the present invention are hydrolyzed copolymers of tetrafluoroethylene and $FSO_2CF_2CF_2OCF=CF_2$. These preferred materials may also contain pendant groups introduced by the addition to the polymerization of the vinyl ether monomers represented by R OCF=$CF_2$ where R is preferrably

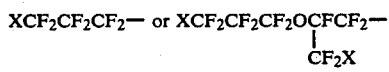

where X=Cl or F. Preferred equivalent weights of the membranes of the present invention are between 800 and 1500 and more preferred between 800 and 1300. The preferred hydration per sulfonic acid functional group is between about 10 and 25 moles of water per equivalent of sulfonic acid. More preferred is between 11 and 19 moles of water per equivalent of sulfonic acid. Hydration per sulfonic acid equivalent is determined by measuring the water absorption of a given weight of dry polymer by the procedure described by Grot for the "Standard Water Absorption". From this, the amount of water absorbed by the weight representing one sulfonic acid equivalent is determined and thus the moles of water per sulfonic acid equivalent.

It has been found that a convenient and meaningful description of the polymer membranes that incorporates both the equivalent weight and the water absorption is a hydration product. The hydration product is defined as the product of the hydration, expressed as moles of water per functional group, and the equivalent weight. Since both of these factors are critical to membrane performance it is particularly useful to combine the two into one term. It is preferred that the hydration product be below about 22,000. The sulfonic acid membranes of the present invention generally have a hydration product falling between about 12,000 and 22,000 whereas the sulfonic acid membranes of the prior art have hydration products falling between about 22,000 and 30,000. It is to be understood that any sulfonic acid membrane having suitable mechanical and physical properties and a hydration product falling below 22,000 and even below 12,000 would be expected to perform well in a chlor-alkali cell.

Many of the properties described above for use of the polymers of the present invention as membranes also apply to one of the polymers as solid superacids for acid catalyst. It is extremely important to have as high an acid concentration (low eq. wt.) as practical in the sulfonic acid polymers used as acid catalyst. A low eq. wt. means that a smaller volume (or weight) of the acid would be required, thus reducing the size of reactors and/or reaction time. A short pendant group and/or low hydration results in polymers with better physical properties at low eq. wts. than the polymers of the prior art having the long pendant group. Thus the polymers of the present invention having hydration products falling below about 22,000 and particularly those having eq. wts. of about 800 to about 1000 have high acid concentration, good physical characteristics and as such should be superior solid super acids useful as acid catalyst.

EXAMPLE 1

A series of ion exchange membranes were prepared and evaluated to determine the equivalent weight of each membrane and its hydration product.

The water absorption was determined for each membrane by first drying the membrane in the $SO_3H$ form film for 16 hours at 110° C., weighing the sample, boiling the sample for 30 minutes in water, blotting the surface dry with towels and then reweighing the film. The difference in weight represented the amount of water absorbed by the film and is commonly referred to as the "Standard Water Absorption".

A sample of each film was cut into 1/16 inch to ⅛ inch wide strips and weighed. Each strip was placed into a beaker having an excess of 0.05 normal NaOH solution and heated for 30 minutes at 50° C. Each film was then rinsed two times for 15 minutes in 75 ml portions of deionized water at 50° C. Each strip was removed and the rinse solutions were combined with the original caustic solution. The combined solution was titrated with a 0.1 normal HCl solution and the number of equivalents of NaOH consumed by the film was determined.

The equivalent weight of each film was determined by dividing the weight of the film by the number of equivalents of caustic consumed.

The water absorption per functional group was then determined by calculating the moles of water that one equivalent of the polymer absorbed. The hydration product was obtained by multiplying the equivalent weight by the moles of water absorbed by one equivalent of the polymer.

The following copolymer and terpolymer membranes of the present invention were evaluated in the manner just described and the results are shown in the following table:

| Polymer | Equivalent Weight | Water Absorption Moles $H_2O/SO_3H$ | Hydration Product × 1000 |
|---|---|---|---|
| 1[1] | 798 | 36.8 | 29.4 |
| 2[1] | 827 | 21.8 | 18.0 |
| 3[1] | 1154 | 18.6 | 21.5 |
| 4[1] | 1340 | 12.7 | 17.0 |
| 5[1] | 1666 | 8.7 | 14.5 |
| 6[2] | 894 | 18.4 | 16.4 |
| 7[2] | 1217 | 13.1 | 15.9 |
| 8[3] | 1350 | 11.4 | 15.3 |

[1]Hydrolyzed copolymer of tetrafluoroethylene and $FSO_2CF_2CF_2OCF=CF_2$
[2]Hydrolyzed terpolymer of tetrafluoroethylene, $FSO_2CF_2CF_2OCF=CF_2$ and $ClCF_2CF_2CF_2OCF=CF_2$
[3]Hydrolyzed terpolymer of tetrafluoroethylene, $$FSO_2CF_2CF_2OCF=CF_2 \text{ and } ClCF_2CF_2CF_2OCFCF_2OCF=CF_2$$
$$|$$
$$CF_2Cl$$

These results are shown by curve CD of the drawing.

The hydration product for membranes of the prior art were calculated in a like manner from the numbers published by Grot (see Background of the Invention)

and are presented here and represented by curve AB on the drawing.

| Equivalent Weight | Hydration Product × 1000 |
|---|---|
| 850 | 29.8 |
| 1000 | 25.4 |
| 1200 | 23.9 |
| 1400 | 23.7 |
| 1600 | 22.4 |

EXAMPLE 2

A portion of the ion exchange membranes of Example 1, having a thickness of from about 8 to about 9 mils were individually tested in a small electrolytic cell. The cell had an anode and a cathode with the ion exchange membrane which was being evaluated sandwiched therebetween, thus separating the cell into an anode chamber and a cathode chamber. Each electrode had a square shape and had an area of 8.63 square inches. Each electrode had a solid, metal stud welded to it. Each stud passed through a wall of the cell and was provided with leak proof seals. Both studs were connected to a power supply. The stud connected to the anode was constructed of titanium, while the stud connected to the cathode was constructed of steel. The anode, itself, was an expanded titanium mesh screen coated with a $RuO_2$-$TiO_2$ mixture, while the cathode was constructed from woven steel wires.

The anode chamber was filled with a saturated NaCl brine solution (approximately 25 weight percent NaCl) and the catholyte chamber was filled with a caustic solution having approximately 12 weight percent NaOH concentration. The cell was energized by applying a constant current of approximately 8.63 amps, to give a current density of 1.0 amps per square inch of electrode area. A saturated brine solution (approximately 25 weight percent NaCl) was flowed into the anode chamber at a rate sufficient to maintain the concentration of the anolyte leaving the cell at approximately 17-20 weight percent NaCl. Deionized water was flowed into the catholyte chamber, in a similar manner, at a rate sufficient to maintain the catholyte leaving the cell at a desired NaOH concentration. During the evaluation of each membrane, the NaOH concentration was varied in order to determine the cell operation over a range of caustic concentrations.

The temperature of the cell was controlled throughout each evaluation at about 80° C. by means of an immersion heater connected to a thermocouple inserted into the anolyte chamber. During the evaluation of each membrane the cell voltage was constantly monitored by measuring the difference in voltage potential between the anode stud and the cathode stud. For each evaluation, the cell was operated for several days to reach equilibrium. Then current efficiency was determined by collecting the catholyte leaving the cell for a given period of time, usually 16 hours, and determining the amount of NaOH actually produced, as compared to the amount theoretically produced at the applied current.

Before the evaluation of each membrane, the following preparatory procedures were followed:
(1) the acid form of each membrane was dried in an oven and then equilibrated at ambient conditions;
(2) the membrane was soaked in a 30 weight % solution of triethanolamine in water for 30 minutes at 25° C.;
(3) the membrane was removed from the solution and air dried; and
(4) the membrane was installed in the above described electrolytic cell.

The following results were obtained:

| | Power Requirement (DCKWH/metric Ton)[1] | |
|---|---|---|
| Polymer | 10% NaOH | 15% NaOH |
| 2 | 2350 | — |
| 3 | 2165 | 2345 |
| 4 | 2345 | 2480 |
| 6 | 2110 | 2390 |
| 7 | 2300 | 2430 |
| 8 | 2495 | 2550 |

[1]Direct current kilowatt hours per metric ton of caustic.

We claim:
1. A process for the electrolysis of an aqueous alkali metal halide which comprises
(a) feeding an aqueous alkali metal halide solution into an anode compartment of an electrolytic cell in which there is an anode in the anode compartment and a cathode in a cathode compartment and in which the anode compartment is separated from the cathode compartment by an ion exchange membrane wherein the ion exchange membrane is a polymer comprising a substantially fluorinated backbone which has recurring pendant groups attached thereto and represented by the formula

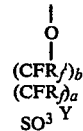

where
a=0-3
b=0-3
a+b=at least 1
$R_f$ and $R_f'$ are independently selected from the group consisting of a halogen and a substantially fluornated alkyl group having one or more carbon atoms
Y is hydrogen or alkali metal wherein the polymer has an equivalent weight of between 800 and 1500 and has a hydration product of less than 22,000; and
(b) electrolyzing the aqueous alkali metal halide solution; and
(c) removing an alkali metal hydroxide solution from the cathode compartment.

2. The process of claim 1 wherein the ion exchange membrane also has recurring pendant groups attached directly to the backbone represented by the general formula O—R where R is a straight or branched substantially completely chlorinated alkyl chain which may be interrupted by oxygen atoms.

3. The process of claim 1 wherein the ion exchange membrane has an equivalent weight of between 800 and 1300.

4. The process of claim 1 wherein the ion exchange membrane has an equivalent weight of less than 1000.

5. The process of claim 1 wherein a=0-2, b=0-2, and the ion exchange membrane has an equivalent weight of less than 1000.

6. The process of claim 1 wherein the aqueous alkali metal halide solution is a sodium chloride solution.

7. The process of claim 1 wherein the alkali metal hydroxide solution is a sodium hydroxide solution.

* * * * *